UNITED STATES PATENT OFFICE.

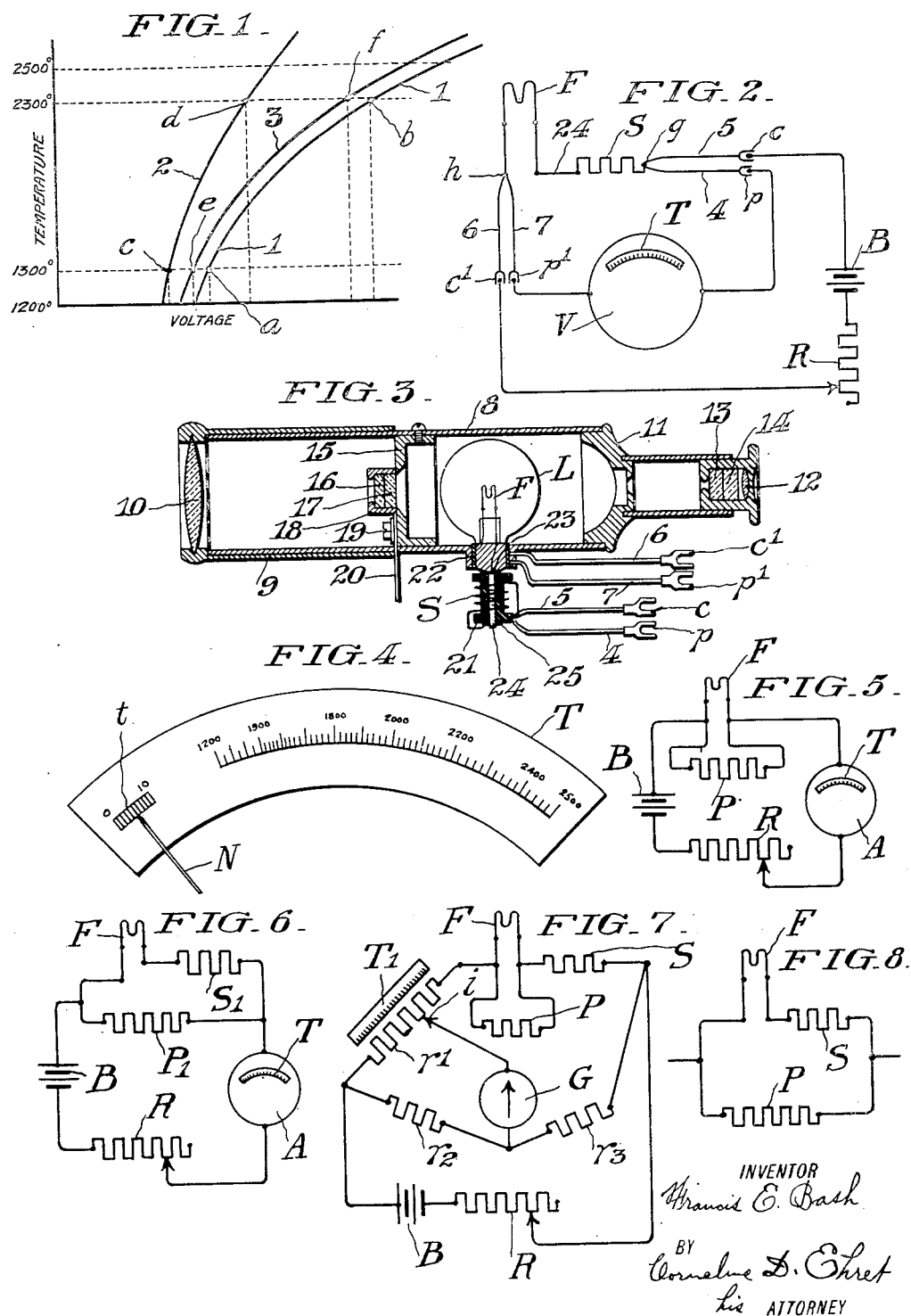

FRANCIS E. BASH, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

OPTICAL PYROMETRY.

1,376,666.

Specification of Letters Patent.

Patented May 3, 1921.

Application filed October 27, 1919. Serial No. 333,547.

*To all whom it may concern:*

Be it known that I, FRANCIS E. BASH, a citizen of the United States, residing in the city and county of Philadelphia, State of Pennsylvania, have invented certain new and useful Improvements in Optical Pyrometry, of which the following is a specification.

My invention relates to optical pyrometry wherein an electric current passed through an incandescible body, as an incandescent electric lamp filament, serving as a light standard, is varied until the brightness of the standard matches the brightness of the incandescent body whose temperature is to be measured, the temperature being then determined from a reading of a galvanometer whose deflection is dependent upon the amount of current traversing the incandescible body or lamp filament.

It is well understood in the art that incandescent electric lamps, though in manufacture they are intended to be similar, vary materially among themselves as regards their temperature-resistance, temperature-voltage or temperature-current characteristics, and are therefore not interchangeable as standards for use in optical pyrometry. This is due to the fact that no two lamps can be made exactly alike, except by rarest chance, since the length and cross section of their filaments vary to such degree as to cause their resistances for a predetermined or definite temperature to differ materially; and for the same definite or predetermined temperature the magnitudes of the currents passed through the filaments and the potential differences between the terminals of the filaments differ.

It is the object of my invention to produce interchangeable standards or lamp units whereby, with any of a number of galvanometers, voltmeters or ammeters having the same characteristics, any one of the standards or lamps may be used with assurance that the temperature measurements made therewith shall be correct within narrow limits.

To these ends I have devised interchangeable lamp units each comprising an incandescent lamp having more or less approximately the desired characteristics, in combination with a resistance of such amount, character and mode of connection as to make the lamp unit interchangeable in the sense that it may be employed with a galvanometer, voltmeter or ammeter, having known or predetermined characteristics, for making accurate measurements of temperatures of incandescent bodies.

My invention resides in optical pyrometric apparatus comprising the combination with a galvanometer, voltmeter or ammeter having predetermined characteristics, of a lamp unit, comprising a lamp and associated means, as resistance, having definite or predetermined characteristics whereby in coöperation with the galvanometer, voltmeter or ammeter accurate measurements of temperatures of incandescent bodies may be made.

My invention resides further in an interchangeable lamp unit or a lamp unit of predetermined characteristics, comprising a lamp and associated resistance, the lamp filament and the resistance being so related as to effect predetermined characteristics.

My invention resides in the system of optical pyrometry, optical pyrometric apparatus, interchangeable lamp unit and method of producing the same, hereinafter described.

It is desirable from the viewpoint of the manufacturer of optical pyrometric apparatus that he may be able to supply in replacement of or substitution for a lamp standard originally a part of the equipment sold, other lamp standards which are interchangeable in the sense that they may be employed with assurance that the temperature measurements made therewith shall be correct. It is further desirable from the manufacturer's viewpoint to be able to supply such interchangeable lamp standards or units for use in any of a great number of apparatus which he has sold, each comprising a galvanometer, voltmeter or ammeter of predetermined constants or characteristics.

Interchangeability of the lamp units or standards is equally desirable from the viewpoint of the user of the pyrometric apparatus, who may then without recalibration of his galvanometer scale or without return of his galvanometer to the maker of the new or substitute lamp unit for recalibration with respect to the new lamp unit, procure new or substitute lamp units with assurance that they will properly coöperate or be properly related to his apparatus to effect accurate temperature measurements.

The lamp units may be caused to have similar temperature-voltage, temperature-current or temperature-resistance characteristics, depending upon the mode of connection or use of the lamp standard in the pyrometric apparatus.

By preference the units are given similar temperature-voltage characteristics, utilizable in those cases where the galvanometer is employed as a voltmeter whose deflections vary with variations in the potential difference across the terminals of the lamp, particularly when its filament has a positive temperature coefficient.

For an understanding of my invention and for an illustration of some of the many different forms it may take, reference is to be had to the accompanying drawings, in which:

Figure 1 is a graphic representation of temperature-voltage characteristics.

Fig. 2 is a diagrammatic view of pyrometric apparatus embodying my invention.

Fig. 3 is a longitudinal sectional view, parts in elevation, of pyrometric apparatus embodying my invention.

Fig. 4 represents a scale of a galvanometer.

Figs. 5, 6, 7 and 8 are diagrammatic views of modifications of my invention.

Referring to Fig. 1, 1 is the characteristic curve of a hypothetical standard or of that lamp of a great number made by a lamp manufacturer in accordance with predetermined specifications, the voltage or difference of potential between whose terminals varies more for a given variation of temperature than all the other lamps of the series, the characteristics of which are to be brought into accord with those of said one lamp or with the hypothetical standard. In Fig. 1 ordinates are temperatures and abscissæ voltages or differences of potential.

Assuming, for example, that the lamp filament is of tungsten, it is utilizable, without interposition of absorption screen, for temperature measurements throughout a range from approximately 1200 degrees F. to approximately 2500 degrees F. The characteristic 1 of the lamp filament is then obtained by taking voltage readings at different temperatures throughout the range; or the curve 1 may be arbitrarily chosen as a hypothetical standard. For example, for two different temperatures, preferably lying within the total temperature range, as for example 1300 and 2300 degrees F. the voltage difference or change is the horizontal distance between the points $a$ and $b$. The interchangeable lamps shall then also require the same change of voltage to effect the same change in temperature, to wit, from 1300 degrees to 2300 degrees F. In Fig. 1, let 2 be the temperature-voltage characteristic of a lamp to be modified so that it shall have a desirable characteristic. As will be noted, the voltage change as between the points $c$ and $d$, corresponding, respectively, with 1300 and 2300 degrees, is less than in the case of the hypothetical standard or the selected lamp whose characteristic curve is 1.

To produce a satisfactory lamp unit comprising the lamp whose characteristic is 2, there is connected in series therewith a resistance, of zero or negligible temperature coefficient, of such suitable magnitude that for a variation of voltage across the lamp filament and the resistance equal to the voltage difference between the points $a$ and $b$ of curve 1, the same voltage change will produce the same change in temperature, namely, from 1300 to 2300 degrees F. The characteristic of the filament and resistance combined, that is, the characteristic of the lamp unit, may then be that indicated by the curve 3, which is substantially parallel to the curve 1, at least in that between the points $e$ and $f$ on the curve 3 corresponding, respectively, with 1300 and 2300 degrees F., there is the same horizontal distance or voltage difference. In rare cases the curve 3 may coincide with the curve 1. Usually, however, it will be substantially parallel to the curve 1, but spaced somewhat therefrom because for any given temperature within the range the absolute or actual voltage applied will ordinarily be different from the corresponding actual voltage of curve 1. This lack of identity between curves 3 and 1 is, however, rectified as hereinafter described.

Referring to Fig. 2, F represents the filament of the lamp and S the aforesaid resistance connected in series therewith. The lamp unit terminals are at $g$ and $h$, the lamp with the resistance S being a unit, the resistance preferably being physically attached to and part of the entire lamp unit structure. To the terminal $g$ may be attached the flexible leads 4 and 5, terminating, respectively, in the clips or terminals $c$ and $p$. Similarly, with the terminal $h$ may be connected the flexible leads or conductors 6 and 7 terminating, respectively, in the clips or terminals $c^1$ and $p^1$. These leads and their terminal clips may form integral parts of the interchangeable lamp unit structure. By the terminals $c$ and $c^1$ the filament and its associated resistance S are connected in series with the source of current or battery B and the rheostat or adjustable resistance R. To the terminals $p$ and $p^1$ are connected the terminals of the deflecting galvanometer V employed as a voltmeter, and having the scale T, preferably calibrated directly in temperature units.

As well understood in the art, the lamp may be employed in structure of the character illustrated in Fig. 3, wherein the lamp L, having the filament F, is disposed within a tube 8 upon which is slidable the tube 9 having at its front end the objective lens 10. The tube 9 is closed at its rear end by the member 11 supporting the eye piece structure having the ocular lens 12 in front of which may be disposed colored glass screens, as 13 and 14. The lamp filament F in Fig. 3 is shown with its plane parallel with the optical axis for clarity of illustration, but as understood in the art, in practice the plane is substantially normal to the optical axis. Between the lamp L and the objective 10 may be located the diaphragm member 15, having an aperture in the optical axis of the instrument, to position in front of which may be moved the absorption screens, as glasses 16 and 17, carried in the supporting member 18 pivoted at 19 and actuated by the handle 20 extending to the exterior of the instrument, the screens 16 and 17 being brought into position in the optical axis for the higher temperature range of the apparatus, if employed, as for example, for temperatures from 2400 or 2500 degrees F. upwardly, as well understood in the art, in which case the scale T will have a second calibration for the higher range.

The galvanometer V may be of any suitable type, the permanent magnet-moving coil or D'Arsonval type being preferred.

As understood in the art, the apparatus is used as follows:

The instrument is sighted upon the incandescent body whose temperature is to be measured. With the screens 16 and 17 displaced to one side out of the optical axis, when a temperature within the lower range is to be measured, the rheostat R, Fig. 2, is adjusted until such current flows through the filament F that it attains the same temperature as that of the body whose temperature is to be measured. This is determined by adjusting the rheostat R that the brightness of the filament F matches the brightness of the incandescent body whose temperature is to be measured. The deflection of the voltmeter V is then read upon a scale T, the galvanometer having previously been calibrated in temperature units with a standard lamp. Such a scale is illustrated in Fig. 4, in which the galvanometer needle or pointer N is shown in its position for zero deflection, that is, its position corresponding to zero potential difference across the lamp filament and its resistance S, In Fig. 3 it will be noted that the resistance S is disposed, as in a coil, upon the spool or member 21, from which the resistance S is insulated if the member 21 be of metal or conducting material, or upon which it may be directly wound if of insulating material. The lamp base comprises the usual metallic sleeve or ferrule 22, to which one terminal of the filament F is connected and the central or button terminal 23 to which the other terminal of the filament F is connected. Soldered or otherwise secured to the button 23 is the metallic rod 24 upon which the spool 21 is held by the nut or washer 25, one terminal of the resistance S being connected through the rod 24 with one terminal of the filament, while the other terminal of the resistance S connects with the aforesaid flexible leads 4 and 5. With the ferrule 22 are connected the aforesaid flexible leads 6 and 7.

The lamp unit or standard therefor comprises the lamp L proper with the resistance S associated therewith on any suitable supporting means, preferably constituting a mechanical unit with the lamp L; and the leads 4 to 7 inclusive may also be permanently a part of the lamp unit structure.

The scales T of the various galvanometers or voltmeters all have identical temperature calibrations when associated with galvanometers having the same constants or characteristics.

But as indicated in Fig. 1 the various lamps will differ among themselves as to the actual voltage impressed thereon for a given temperature. To overcome these differences among various lamps each scale T is provided with a small correction scale or calibration $t$, Fig. 4, comprising a plurality of preferably equally spaced marks extending to either side or both sides of the true zero position of the galvanometer needle or pointer N.

When supplying a new lamp unit which will suitably coöperate with the temperature calibrations of the scale T the user is advised to shift the zero of his instrument, as by shifting the abutments of the spiral springs of the movable coil of the galvanometer, until the pointer N, with no current through the instrument, points at a certain calibration mark of the small scale $t$. Thus in the case of a lamp whose characteristic curve is 3 of Fig. 1, less absolute or actual voltage is required to raise the filament to a given temperature than in the hypothetical case or the case of the selected lamp whose characteristic curve is 1. This means that the moving coil and pointer of the galvanometer needs to deflect a less distance before reaching the 1200 degree calibration of the scale T. This difference in the actual voltages in the cases of curves 3 and 1 is known to produce a predetermined deflection of the pointer or needle N and the user is then told to shift his zero, as aforesaid, a corresponding amount, whereupon at 1200 degrees and at all other temperatures the needle N will point to the proper reading upon the scale T when using the substitute or replacement lamp unit.

The magnitude of the resistance S is calculated as follows:

$$S = \frac{R - E_{2300} + E_{1300}}{I_{2300} - I_{1300}}$$

Where

R = the difference in voltage of the standard lamp at 2300 degrees F. and 1300 degrees F.

$E_{2300}$ = the voltage drop across the lamp at 2300 degrees F.

$E_{1300}$ = the voltage drop across the lamp at 1300 degrees F.

$I_{2300}$ = the current required by the lamp at 2300 degrees F.

$I_{1300}$ = the current required by the lamp at 1300 degrees F.

In Fig. 5 is illustrated the circuit arrangement when the galvanometer is an ammeter A, preferably of the D'Arsonval type, connected in series with the lamp filament F, battery B and rheostat R. In this instance, in order that the lamp shall be interchangeable, there is chosen the characteristic of an actual lamp of the series which for a given temperature change requires the greatest change in strength of current passed through the filament. In this case the mode of procedure is in general similar to that hereinbefore described, except that each lamp unit comprises in addition to the filament F a resistance P connected in parallel with the filament. The magnitude of the resistance P is of such suitable value as to give to the lamp the desired characteristic or one somewhat displaced therefrom but parallel thereto. In this case again the zero of the ammeter may be shifted by an amount given by directions accompanying the standard lamp.

The magnitude of the resistance P, which preferably has a zero temperature coefficient, is determined as follows:

$$P = \frac{E_{2300} - E_{1300}}{R - (I_{2300} - I_{1300})}$$

Where

P = resistance in parallel with lamp.

$E_{2300}$ = voltage drop across lamp at 2300 degrees F.

$E_{1300}$ = voltage drop across lamp at 1300 degrees F.

R = current range of standard lamp.

$I_{2300}$ = current taken by lamp at 2300 degrees F.

$I_{1300}$ = current taken by lamp at 1300 degrees F.

In Fig. 6 is shown an arrangement in general similar to that described in Fig. 5, except that the resistance $P^1$ is in shunt to the filament F and the serially connected resistance $S^1$ of such suitable magnitude as to change the voltage range of the lamp unit; and a lamp so provided with resistances $S^1$ and $P^1$ may be used with a galvanometer connected either in voltmeter or ammeter relation.

In Fig. 7 is shown a circuit arrangement for utilizing changes in the resistance of the filament with temperature change for affording temperature readings. In this case there is in parallel with the lamp filament F a resistance P and in series with it a resistance S. In this case a hypothetical temperature-resistance characteristic is chosen for the temperature-resistance characteristic of that lamp of a series having the least slope with respect to the temperature axis, that is, the lamp whose characteristic shows the smallest resistance change for a given change of temperature. Such a lamp may be selected as the standard to which the others of the series are made to conform. The other lamps of the series, whose characteristics have greater slopes with respect to the temperature axis, may then be modified by connecting in parallel with the lamp filament a resistance P of negligible or zero temperature coefficient. The application of resistance in parallel to the filament decreases the slope of the characteristic and by choosing the resistance P of suitable value the slope may be made that of the selected standard lamp or hypothetical characteristic. Furthermore, by the addition of series resistance S, the characteristics can be caused to coincide at two temperatures, for example, 1300 and 2300 degrees F., and since the curvatures of the characteristics of all the lamps are approximately the same, the lamps will become interchangeable in the sense that they will all be utilizable with the same scale and galvanometer.

To calculate the resistances P and S, the characteristic curve of the standard or selected lamp or the hypothetical characteristic must be known. From this characteristic the difference of the resistances of the standard lamp at the two temperatures at which it is desired the lamp characteristics shall coincide, for example, 1300 and 2300 degrees F., is known and may be designated D.

Let $R_{13s}$ = resistance of standard lamp at 1300 degrees F.

$R_{23s}$ = resistance of the standard lamp at 2300 degrees F.

Then $$D = R_{23s} - R_{13s}.$$

Let
$R_{13}$ = the resistance of the filament at 1300 degrees F. of any lamp to be modified.
$R_{23}$ = the resistance of the filament of the same lamp at 2300 degrees F.
S = the resistance in series with the lamp filament.
P = the resistance in parallel with the lamp filament.

Then $$D = \frac{R_{23} \times P}{R_{23}+P} - \frac{R_{13} \times P}{R_{13}+P}$$

From which $$P = \frac{(R_{23}+R_{13}) \pm \sqrt{(R_{23}+R_{13})^2 - 4R_{13}R_{23}(R_{23}-R_{13}-D)}}{2(R_{23}-R_{13}-D)}$$

$$S = R_{13s} - \frac{R_{13} \times P}{R_{13}+P}$$

The filament F with its resistances P and S may then be connected in any suitable relation for resistance measurements.

In Fig. 7 the filament with its resistances P and S is connected in one arm of a Wheatstone bridge in the other arms of which are the resistances $r^1, r^2$ and $r^3$. With the bridge is associated the source of current or battery B and rheostat R, adjustment of which varies the current through the bridge structure and through the filament F to bring it to the desired brightness for matching the brightness of the body whose temperature is to be measured. The galvanometer G is connected from a point between the resistances $r^2$ and $r^3$ to a contact $i$ slidable upon the resistance $r^1$, with which latter may be associated the scale $T^1$ calibrated directly in temperature units or in any other suitable units. With the adjustment of the rheostat R for current strength through the filament F for desired brightness match, the contact $i$ is moved along the resistance $r^1$ until no current flows through the galvanometer G, which fact is indicated by zero deflection. The temperature is then read off the scale $T^1$ opposite the movable contact $i$.

In lieu of the arrangement of resistances P and S with filament F as indicated in Fig. 7, they may be arranged as indicated in Fig. 8, where the resistance P is in parallel to the filament F in series with the resistance S. For this arrangement the values of the resistances P and S may be calculated by methods similar to those indicated above for the arrangement indicated in Fig. 7.

My invention will be understood to be applicable to lamp filaments of positive temperature coefficient, as of tungsten, etc., and also to filaments of negative temperature coefficient, as of carbon.

What I claim is:

1. A system of optical pyrometry comprising a galvanometer having a scale corresponding with a predetermined temperature-electrical characteristic of an electrically incandescible body, a plurality of electrically incandescible bodies differing among themselves with respect to their temperature-electrical characteristics, and means of constant effect associated with each of said bodies forming therewith a standard having throughout a range of temperatures a temperature-electrical characteristic similar to said predetermined characteristic for said range of temperatures and utilizable interchangeably with said galvanometer and its scale.

2. A system of optical pyrometry comprising a galvanometer having a scale reading directly in temperature units and corresponding with a predetermined temperature-electrical characteristic of an electrically incandescible body, a plurality of electrically incandescible bodies differing among themselves with respect to their temperature-electrical characteristics, and resistance of constant magnitude associated with each of said bodies forming therewith a standard having throughout a range of temperatures, a temperature-electrical characteristic similar to said predetermined characteristic for said range of temperatures and utilizable interchangeably with said galvanometer and its said scale.

3. Optical pyrometric apparatus comprising a galvanometer having a scale corresponding with a predetermined temperature-electrical characteristic of an electrically incandescible body, a coöperating incandescible body having a temperature-electrical characteristic differing from the aforesaid characteristic, and means of constant effect associated with said last named body for producing throughout a range of temperatures a characteristic similar to the characteristic of said first named body for said range of temperatures.

4. Optical pyrometric apparatus comprising a galvanometer having a scale corresponding with a predetermined temperature-electrical characteristic of an electrically incandescible standard, an electrically incandescible body having a different temperature-electrical characteristic, and resistance of constant magnitude associated with said body and forming therewith a standard having throughout a range of temperatures a temperature-electrical characteristic similar to said predetermined temperature-electrical characteristic for said range of temperatures.

5. Optical pyrometric apparatus comprising a galvanometer having a scale calibrated directly in temperature units and corresponding with a predetermined temperature - electrical characteristic of an electrically incandescible standard, an electrically incandescible body having a dissimilar temperature-electrical characteristic, and resistance of constant magnitude associated with said body and forming therewith a standard having for a range of temperatures a temperature-electrical characteristic similar to said predetermined temperature-electrical characteristic for said range of temperatures.

6. Optical pyrometric apparatus comprising a galvanometer having a scale corresponding with a predetermined temperature electrical characteristic, and a coöperating light standard comprising an incandescent lamp filament and coöperating resistance of constant magnitude, said filament having for a range of temperatures a temperature-electrical characteristic differing from said first named characteristic for said range of temperatures and modified to similarity therewith by said resistance.

7. Optical pyrometric apparatus comprising a galvanometer having a scale calibrated directly in temperature units and corresponding with a predetermined temperature-electrical characteristic, and a coöperating light standard comprising an incandescent lamp filament and coöperating resistance of constant magnitude, said filament having for a range of temperatures a temperature-electrical characteristic differing from said first named characteristic for said range of temperatures and modified to similarity therewith by said resistance.

8. Optical pyrometric apparatus comprising a galvanometer having a scale corresponding with a predetermined temperature-voltage characteristic, and a coöperating lamp standard comprising a filament having for a range of temperatures a temperature - voltage characteristic differing from said predetermined characteristic, and resistance of constant magnitude in series with said filament, whereby the characteristic of the lamp standard is modified to similarity with said predetermined characteristic for said range of temperatures, and connections for connecting said galvanometer in voltmeter relation with respect to the filament circuit.

9. Optical pyrometric apparatus comprising a galvanometer having a scale calibrated directly in temperature units and corresponding with a predetermined temperature-voltage characteristic, and a coöperating lamp standard comprising a filament having for a range of temperatures a temperature - voltage characteristic differing from said predetermined characteristic, and resistance of constant magnitude in series with said filament, whereby the characteristic of the lamp standard is modified to similarity with said predetermined characteristic for said range of temperatures, and connections for connecting said galvanometer in voltmeter relation with respect to the filament circuit.

10. Optical pyrometric apparatus comprising a galvanometer having a scale corresponding with a predetermined temperature-voltage characteristic, and a coöperating lamp standard comprising a filament having a temperature-voltage characteristic differing from said predetermined characteristic and resistance of constant magnitude in series with said filament, whereby the characteristic of the lamp standard is modified to similarity with said predetermined characteristic throughout the range of temperatures to be measured, and connections for connecting said galvanometer in shunt with said filament and resistance.

11. Optical pyrometric apparatus comprising a galvanometer having a scale corresponding with a predetermined temperature-electrical characteristic of an electrically incandescible body, a coöperating incandescible body having a temperature-electrical characteristic differing from said predetermined characteristic, means associated with said last named body for producing a characteristic similar to the characteristic of said first named body, and means for varying the relation of said scale with respect to the zero position of the moving system of said galvanometer.

12. Optical pyrometric apparatus comprising a galvanometer having a scale corresponding with a predetermined temperature-electrical characteristic of an electrically incandescible standard, an electrically incandescible body having a different temperature-electrical characteristic, a resistance associated with said body and forming therewith a standard having a characteristic similar to said predetermined temperature-electrical characteristic, and means for varying the relation of said scale with respect to the zero position of the moving system of said galvanometer.

13. Optical pyrometric apparatus comprising a galvanometer having a scale calibrated directly in temperature units and corresponding with a predetermined temperature-electrical characteristic of an electrically incandescible standard, an electrically incandescible body having a different temperature-electrical characteristic, a resistance associated with said body and forming therewith a standard having a characteristic similar to said predetermined temperature-electrical characteristic, and means for varying the relation of said scale with respect to the zero position of the moving system of said galvanometer.

14. Optical pyrometric apparatus comprising a galvanometer having a scale corresponding with a predetermined temperature-electrical characteristic, an incandescent lamp filament and a coöperating resistance, said filament having a temperature-electrical characteristic differing from said predetermined characteristic and modified to similarity therewith by said resistance, and means for varying the relation of said scale with respect to the zero position of the moving system of said galvanometer.

15. Optical pyrometric apparatus comprising a galvanometer having a scale calibrated directly in temperature units and corresponding with a predetermined temperature-voltage characteristic, a lamp filament having a temperature-voltage characteristic differing from said predetermined characteristic, resistance in series with said filament forming therewith a lamp standard whose characteristic is similar to said predetermined characteristic, connections for connecting said galvanometer in voltmeter relation with respect to the filament circuit, and means for varying the relation of said scale with respect to the zero position of the moving system of said galvanometer for compensating for the difference between the actual voltages of said predetermined characteristic and the characteristic of said lamp standard at a given temperature.

16. Optical pyrometric apparatus comprising a galvanometer having a scale corresponding with a predetermined temperature-voltage characteristic, and a coöperating lamp standard comprising a filament having a temperature-voltage characteristic differing from said first named characteristic and resistance in series with said filament whereby the characteristic of the lamp standard is similar to said predetermined characteristic, connections for connecting said galvanometer in shunt with said filament and resistance, and means for varying the relation of said scale with respect to the zero position of the moving system of said galvanometer for compensating for the difference between the actual voltages of said predetermined characteristic and the characteristic of said lamp standard at a given temperature.

17. The combination with a lamp filament having an optical pyrometric temperature-electrical characteristic differing from a predetermined characteristic, of a resistance of constant magnitude associated with said filament producing a pyrometric standard whose characteristic throughout a range of temperatures to be measured is similar to said predetermined characteristic.

18. The combination with a lamp filament having an optical pyrometric temperature-voltage characteristic differing from a predetermined characteristic, and a resistance of constant magnitude in series with said filament producing a pyrometric standard whose temperature - voltage characteristic throughout a range of temperatures to be measured is similar to said predetermined characteristic.

19. The combination with a lamp filament having a positive temperature coefficient and an optical pyrometric temperature-voltage characteristic differing from said predetermined characteristic, of a resistance of constant magnitude in series with said filament producing a pyrometric standard whose temperature-voltage characteristic throughout a range of temperatures to be measured is similar to said second named characteristic.

20. An optical pyrometric lamp standard comprising an incandescent electric lamp whose filament has a temperature-electrical characteristic differing from a predetermined characteristic, and a resistance of constant magnitude attached to said lamp and forming therewith a unit, said resistance forming with a lamp filament a combination whose temperature - electrical characteristic throughout a range of temperatures to be measured is similar to said predetermined characteristic.

21. An optical pyrometric lamp standard comprising an incandescent electric lamp whose filament has a temperature-voltage characteristic differing from a predetermined characteristic, and a resistance of constant magnitude attached to said lamp and forming therewith a unit, said resistance connected in series with said filament and forming therewith a pyrometric standard whose temperature - voltage characteristic throughout a range of temperatures to be measured is similar to said predetermined characteristic.

22. An optical pyrometric standard comprising an incandescent electric lamp whose filament has a positive temperature coefficient and a temperature-voltage characteristic differing from a predetermined characteristic, and a resistance of constant magnitude attached to said lamp and forming therewith a unit, said resistance connected in series with said filament and forming therewith a pyrometric standard whose temperature-voltage characteristic throughout a range of temperatures to be measured is similar to said predetermined characteristic.

23. The method of producing an optical pyrometric lamp unit having a temperature-electrical characteristic similar throughout a range of temperatures to be measured to a predetermined temperature-electrical characteristic, which consists in determining the extent of change between predetermined temperatures of incandescence of an electrical property of the filament of an electric incandescent lamp, and associating with said filament a resistance in such relation therewith and of such constant magnitude that the combination exhibits between the same said temperatures an extent of change of said electrical property equal to the extent of change of said electrical property between the same said temperatures of said predetermined temperature - electrical characteristic.

24. The method of producing an optical pyrometric lamp unit having a temperature-voltage characteristic similar throughout a range of temperatures to be measured to a predetermined temperature - voltage characteristic, which consists in determining the voltage range between two different temperatures of incandescence for the filament of an electrical incandescent lamp, and combining with said filament in series therewith a resistance of such constant magnitude that the voltage range for the combination between said same temperatures is equal to the voltage range between the same temperatures on said predetermined characteristic.

25. Optical pyrometic apparatus comprising a galvanometer having a scale corresponding with a predetermined temperature-electrical characteristic, said scale calibrated directly in temperature units and beginning at a distance from the zero of said scale, an incandescent lamp filament and a coöperating resistance of constant magnitude, said filament having a temperature-electrical characteristic differing from said predetermined characteristic and modified to similarity therewith by said resistance throughout a range of temperatures to be measured, said scale having adjacent the zero thereof a plurality of guide marks, and means for varying the relation of said guide marks of said scale with respect to the zero position of the moving system of said galvanometer.

26. The combination with a lamp filament having an optical pyrometric temperature-electrical characteristic differing from a predetermined characteristic, of resistances of constant magnitudes in series and shunt relations with said filament producing a pyrometric standard whose characteristic in similar to said predetermined characteristic throughout a range of temperatures.

27. The combination with a lamp filament having an optical pyrometric temperature-electrical characteristic differing from a predetermined characteristic, of a resistance of constant magnitude in series with said filament, and a resistance of constant magnitude shunted across said filament and said first named resistance, whereby there is produced a pyrometric standard whose characteristic is similar to said predetermined characteristic throughout a range of temperatures.

28. The combination with a lamp filament having an optical pyrometric temperature-electrical characteristic differing from a predetermined characteristic, of a resistance of constant magnitude in shunt relation therewith producing a pyrometric standard whose characteristic is similar to said predetermined characteristic throughout a range of temperatures.

29. An optical pyrometric lamp standard comprising an incandescent electric lamp whose filament has a temperature-electrical characteristic differing from a predetermined characteristic, a resistance and leads attached to said lamp and forming therewith a unit, said resistance being of constant magnitude and forming with the lamp filament a pyrometric standard whose temperature-electrical characteristic is similar to said predetermined characteristic throughout a range of temperatures.

30. Optical pyrometric apparatus comprising a galvanometer having a scale corresponding with a predetermined temperature-electrical characteristic of an electrically incandescible body, a coöperating incandescible body having a temperature-electrical characteristic differing from said predetermined characteristic, means of constant effect associated with last named body for producing throughout a range of temperatures to be measured a characteristic similar to the characteristic of said first named body, and means for varying the zero of said galvanometer.

In testimony whereof I have hereunto affixed my signature this 25th day of October, 1919.

FRANCIS E. BASH.